United States Patent [19]
Arsenault

[11] Patent Number: 5,408,650
[45] Date of Patent: Apr. 18, 1995

[54] MEMORY ANALYSIS SYSTEM FOR DYNAMICALLY DISPLAYING MEMORY ALLOCATION AND DE-ALLOCATION EVENTS ASSOCIATED WITH AN APPLICATION PROGRAM

[75] Inventor: Mark E. Arsenault, Mason, N.H.

[73] Assignee: Digital Equipment Corporation, Maynard, Mass.

[21] Appl. No.: 84,890

[22] Filed: Jun. 29, 1993

[51] Int. Cl.$^6$ .................. G06F 11/34; G06F 9/46; G06F 9/44; G06F 15/00

[52] U.S. Cl. ........................ 395/575; 395/650; 395/725; 395/164

[58] Field of Search ........... 395/575, 118, 164, 650, 395/725; 364/282.2, 860, 962, 967.4, 967.5

[56] References Cited

U.S. PATENT DOCUMENTS

| | | | |
|---|---|---|---|
| 5,067,072 | 11/1991 | Talati et al. ............ | 395/650 |
| 5,088,036 | 2/1992 | Ellis et al. ............. | 395/425 |
| 5,129,084 | 7/1992 | Kelley, Jr. et al. ..... | 395/650 |
| 5,187,790 | 2/1993 | East et al. ............. | 395/725 |
| 5,193,180 | 3/1993 | Hastings et al. ....... | 395/575 |
| 5,335,323 | 8/1994 | Kolnick .................. | 395/164 |
| 5,343,560 | 8/1994 | Takeda et al. ......... | 395/166 |

OTHER PUBLICATIONS

Microsoft Windows Software Development Kit, Guide to Programming, 1990, Chapters 15–16.
Case Vision/Workshop User's Guide, Silicon Graphics, Inc., 1992, pp. 16/1–7, 19/30–33, 24/1–7.
VMS Documentation Set, RTL Library Manual, Digital Equipment Corporation, Apr. 1988, Chapter 5.

*Primary Examiner*—Robert W. Beausoliel, Jr.
*Assistant Examiner*—Norman M. Wright
*Attorney, Agent, or Firm*—A. Sidney Johnston; Cesari & McKenna

[57] ABSTRACT

A memory analysis system analyzes memory "events," i.e., the allocation or deallocation of memory locations, associated with the execution of an application program and produces a graphic display associating dynamically allocated memory segments with various program sub-routines. The system communicates with a debugger to trace the memory allocation routines back through the source code version of the application program and produce a call-stack, which lists the various source code sub-routines associated with the allocation of the segment and makes available the applicable lines of the source code. The system assigns to each of these locations a segment type, which relates to a program sub-routine that calls for it. The system includes a kernel processor that replaces calls to memory allocation and deallocation routines in the program with substitute routines that include instructions to notify the kernel processor each time a memory event occurs. The kernel processor monitors the response from the operating system and sends to a main processor included in the system a message that indicates the type event, identifies the memory locations involved and includes related information from the debugger tables which identifies the associated source code sub-routines. The main processor then controls the graphic display of the information. The kernel and the main processors communicate through a section of global memory that is set up as one or more circular queues. The kernel processor suspends the execution of the application program whenever the memory event queue is full, to maintain the application program and the display in relative synchronism.

15 Claims, 5 Drawing Sheets

FIG. 2

MEMORY ANALYSIS SYSTEM FOR DYNAMICALLY DISPLAYING MEMORY ALLOCATION AND DE-ALLOCATION EVENTS ASSOCIATED WITH AN APPLICATION PROGRAM

FIELD OF THE INVENTION

The invention relates generally to computer memories, and more particularly, to a system for analyzing dynamic allocation of memory.

BACKGROUND

Computer systems contain a finite number of memory locations. These locations may be dedicated to the temporary storage of data or software applications, i.e., programs, or may be dynamically allocated to the programs as they operate to hold data required or produced by a program during execution. A program which analyzes data obtained from a data base, for example, utilizes memory locations temporarily to hold the data retrieved from the data base and also to hold the results of the analysis. These memory locations are required only during the execution of the program, and are thus allocated dynamically as needed, so that they remain otherwise available.

When the program completes its manipulation of various data from the data base, the program can then deallocate, or release, the dynamically allocated memory locations used to hold this data. This frees the locations for other uses and/or for re-use by the same program. Similarly, if various results of the data manipulation are no longer needed, the program can release the memory locations used to store the results. Such allocations and releases may occur many times throughout the execution of the program.

To allocate and release memory locations, the programs invoke memory allocation and deallocation routines, which are low-level operating system routines, commonly referred to as "service routines," that control the actual allocation and release of the system memory locations. There are various types of memory allocation/deallocation routines directed to particular arrangements of memory locations. One such routine directs the allocation of memory locations as various sizes of blocks, i.e., predetermined numbers of proximate memory locations. Various other routines direct the allocation of memory locations as pages i.e., locations with the same higher order addresses, and so forth. A program which calls for the allocation of unnecessarily large blocks of memory, particularly large contiguous blocks, may interfere with the operation of other programs that are running simultaneously on the system. Alternatively, programs which call for the allocation of memory in blocks that are too small may interfere with their own operations.

A user may not be aware of a problem with memory allocation. A program may run inexplicably slowly, for example, when memory is allocated in blocks which are too small. Such a program must invoke the memory allocation routines more often than would be required if larger blocks of memory were requested by the program. Each invocation takes time, and thus, the program is delayed but otherwise operates as expected. Another problem which is not readily detected is that of memory fragmentation, which, for example, increases the time required to access a table stored in non-contiguous memory locations. The user can not appropriately modify the program to avoid these delays and time-consuming access operations, unless he or she learns of the problems.

Programs which invoke memory allocation routines should also invoke deallocation routines, to release the allocated memory locations. Otherwise, the memory locations remain unavailable for other uses, even repeated uses by the same program. If, for example, a program sub-routine which calls a memory allocation routine, but not an associated memory deallocation routine, is invoked repeatedly to calculate intermediate values, the sub-routine calls for new memory locations at each invocation and retains those previously allocated. Accordingly, the program sub-routine acquires more and more locations, and prevents other sub-routines from using these locations.

Determining when, or if, memory locations are to be released by various routines is often a problem in a large and/or complex program, even if the program is highly structured. For example, the call to the memory deallocation routine may be part of the program sub-routine which includes the call to the allocation routine, or it may be part of any number of related program sub-routines which utilize that sub-routine. Tracing these commands through the various sub-routines can be a difficult task.

The memory deallocation routines must be of the same type as the associated allocation routines. Otherwise, the deallocation routines do not release the locations. Memory locations allocated in pages or in blocks, for example, must be released in pages or in blocks of the same size. Accordingly, a user may include in a sub-routine a call to the wrong deallocation routine and be unaware of the ineffectiveness of this routine.

Memory analyzers that indicate to a user the status of the respective memory locations, i.e., whether the locations are free or allocated, have recently become available. While these memory analyzers, such as Heap View, marketed by Silicon Graphics Incorporated, provide an overview of dynamic memory allocation, they do not provide enough information to enable a user to analyze whether a program, or more specifically a program sub-routine and/or related sub-routines, appropriately allocate and/or release memory locations. In particular, the Heap View analyzer requires that a user define "intervals." It then points out "errors" in the intervals, such as unreleased memory locations or "bad" releases, which are releases of memory locations that either have not been allocated or have been previously released. If a release occurs in a different interval from that of the associated allocation, the Heap View analyzer mistakenly points to the release as an error. Also, the analyzer will not necessarily reveal a situation in which memory is allocated in blocks that are either too large or too small. Thus, it does not always provide sufficient information to determine when actual errors occur or when memory is used inefficiently.

SUMMARY

The invention is a memory analysis system which analyzes memory "events," i.e., the allocation or deallocation of memory locations, associated with the execution of an application program and produces a graphic display associating dynamically allocated memory locations with various program sub-routines. The locations assigned to a source code sub-routine by a particular memory event are referred to collectively as a memory segment. For each segment, the system traces the memory, allocation routines back through the source code version of the application program to produce a call-stack, which is a list of the various source code sub-routines associated with the allocation of the segment. The system also makes available the applicable lines of the source code from the sub-routines named in the call-stack.

The memory analysis system communicates directly with the application program during program execution. Each time the application program initiates a memory event, the memory analysis system evaluates the associated memory allocation or deallocation routine, as appropriate, and the response of the operating system to determine which memory locations are newly allocated to or released from the program. If the memory event is a memory allocation, the system also assigns to each of the allocated locations a segment type, which relates to a program sub-routine that calls for that location, as described in more detail below. The system then updates the display appropriately by adding or removing information.

The memory analysis system includes a kernel processor, which acquires memory event data from the application program and the operating system, and a main processor, which analyzes the data. The term "processor" used herein refers not only to a separate hardware processor, but also, to a process, a program module, an image and/or any combination thereof.

The main processor sends memory location information to a display unit which includes a display controller and a display device, such as a screen. The display unit, in response to instructions from the main processor, produces a display which graphically depicts allocated memory segments by segment type, corresponding call-stacks, lines of source code and so forth.

In a preferred embodiment, the memory analysis system communicates with a debugger. The debugger analyzes the execution of the program in a conventional manner and relates "symbols" and locations of the compiled executable version of the program, that is, the image file, to symbols and locations in the source code version of the program. The memory analysis system then uses this information to generate the call-stacks and make available the related lines of source code.

More specifically, the kernel processor includes in an application program an initialization routine which replaces calls to memory allocation and deallocation routines in the program with substitute memory allocation and deallocation routines. These latter routines include instructions to notify the kernel processor each time the program calls a memory allocation or deallocation routine, i.e., each time a memory event occurs. Since these routines include the calls to allocation/deallocation routines which they replace, each memory event is performed as expected in the application program.

When the kernel processor receives notice of a memory event, it monitors the response from the operating system and sends to the main processor a message that indicates whether an allocation or a release has occurred, identifies the memory locations involved and includes related information from the debugger tables which identifies the associated source code sub-routines.

The kernel and the main processors communicate through a section of "global," or shared, memory. The global memory is set up as one or more circular queues to which both processors have access. The kernel processor adds memory event messages to a memory event queue at the time the memory events occur, and the main processor thereafter retrieves the memory event messages from the queue when the processor is ready to process them. The main processor then analyzes the memory event messages and sends updated information to the display unit.

The main processor must coordinate with the controller in the display unit which, in turn, is performing time-consuming bit mapping operations to produce bit maps for the display device. Accordingly, the operations of the main processor may fall behind those of the application program, particularly if memory events occur in rapid succession. To keep the main processor, and thus, the displayed information in relative synchronism with the application program, the kernel processor suspends the execution of the application program whenever the memory event queue is full. As soon as the main processor notifies the kernel processor that a predetermined number of messages have been removed from the queue, the kernel processor allows the application program to continue.

A user can request that the memory analysis system display additional information about selected memory locations, such as the addresses of individual memory locations. The user may also designate the level of detail in the graphic display and change the designation, as desired. The user requests the additional information and/or specifies the level of detail desired by interacting with the display device via a mouse or keyboard.

The system must (i) respond to the user requests at appropriate times, (ii) control the execution of the application program as it responds to the requests and keep the operations of the main processor and the program in relative synchronism, and (iii) revise the display, call-stack and source code information supplied to the user in accordance with the requests. To do all this, the main processor executes a "main loop," which includes nested loops, respectively, for the processing of user-initiated requests from the display unit, communications from the kernel processor and memory event messages. The requests from the display unit have the highest priority and are handled first. Appropriate communications to and from the kernel processor to control the execution of the application program and, as necessary, to supply the main processor with memory, event-related information are sent between the processors as part of the processing of the user-initiated requests. Once these requests are handled, the main processor continues to process the memory-event messages in order of their receipt by the queue. The operations of the kernel processor and the main processor are discussed in more detail below.

DESCRIPTION OF THE DRAWINGS

The above and further advantages of the invention may be better understood by referring to the following description in conjunction with the accompanying drawings, in which:

FIG. 2 is a diagram of a display produced by the system depicted in FIG. 1;

DETAILED DESCRIPTION

This section of the application is divided into three subsections, namely, System Overview, System Features and System Operation. The System Overview subsection describes the system components. One or more of the "processors" discussed in this section may be processes or modules. The System Features subsection describes the information which the system makes available to a user through a display. The System Operation subsection describes the operations of the various system components. The terms used in the discussion of the system features and the system operation are terms used in conjunction with the VMS operating system developed by Digital Equipment Corporation. While the features and operations of the memory analysis system are described using these VMS-specific terms, the discussion is not meant to limit the applicability of the invention to systems operating in accordance with this operating system.

I. System Overview

Figure 1:
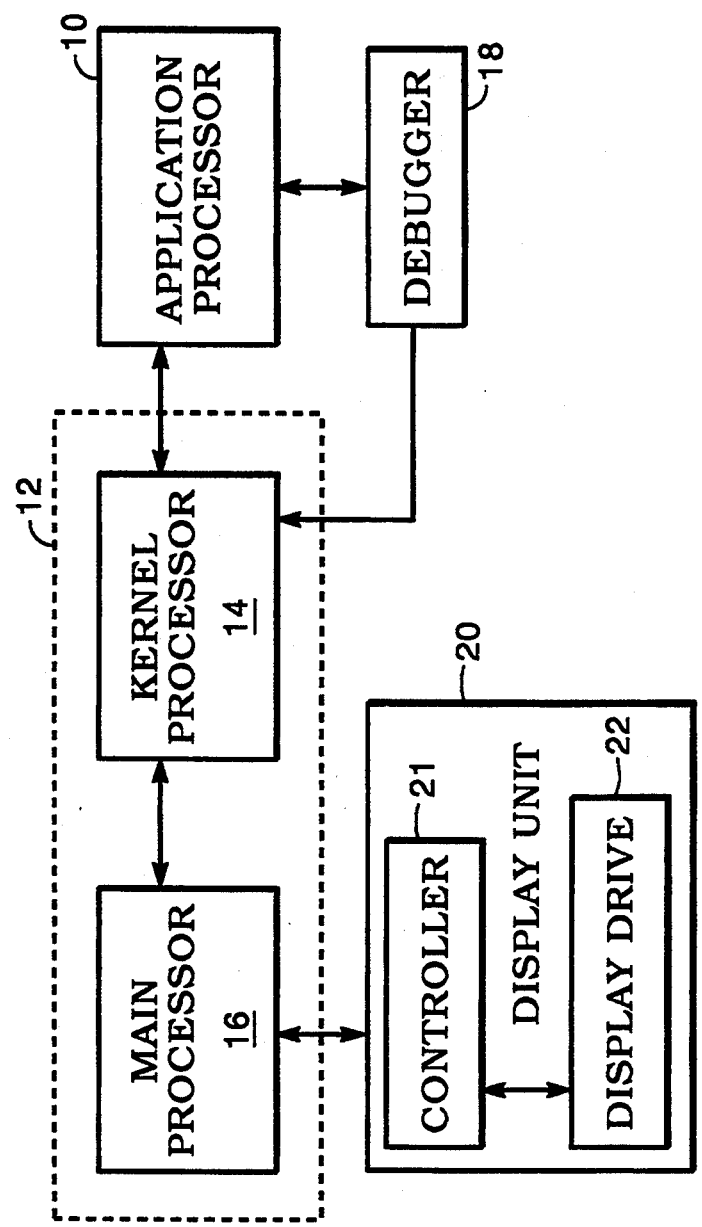
FIG. 1 is a functional block diagram of a memory analysis system constructed in accordance with the current invention.

Referring to FIG. 1, an application processor 10 runs, or executes, an application program, which is monitored by a memory analysis system 12 and a debugger 18. The application processor 10, memory analysis system 12 and the debugger 18 operate in accordance with an operating system which, among other things, controls dynamic allocation and deallocation, or release, of memory locations in response to calls for memory allocation/deallocation from the application processor 10.

The memory analysis system includes a kernel processor 14 which monitors memory events, i.e., the allocation and release of memory locations, and a main processor 16 which analyses memory events. The debugger 18 operates in a conventional manner and analyzes the execution of the application program, at the same time formulating debugger symbol tables which relate symbols and locations in the executable version of the program to symbols and locations in a source code version of the program. The kernel processor 14 and the main processor 16 utilize the debugger symbol tables to determine which of the source code routines are related to individual memory events. Using this information the system produces associated call-stacks, which list the names of the related source code routines in reverse hierarchical order, as discussed below.

The main processor 16 provides a display unit 20 with information from which a controller 21, in a conventional manner, formulates display instructions for a display device 22. The display device 22, in turn, provides to a user a graphic display of dynamically allocated memory segments depicted by segment type, associated call-stacks and so forth. The user can customize the display using embedded "buttons" and pull-down menus, as discussed below.

II. System Features

Figure 2:
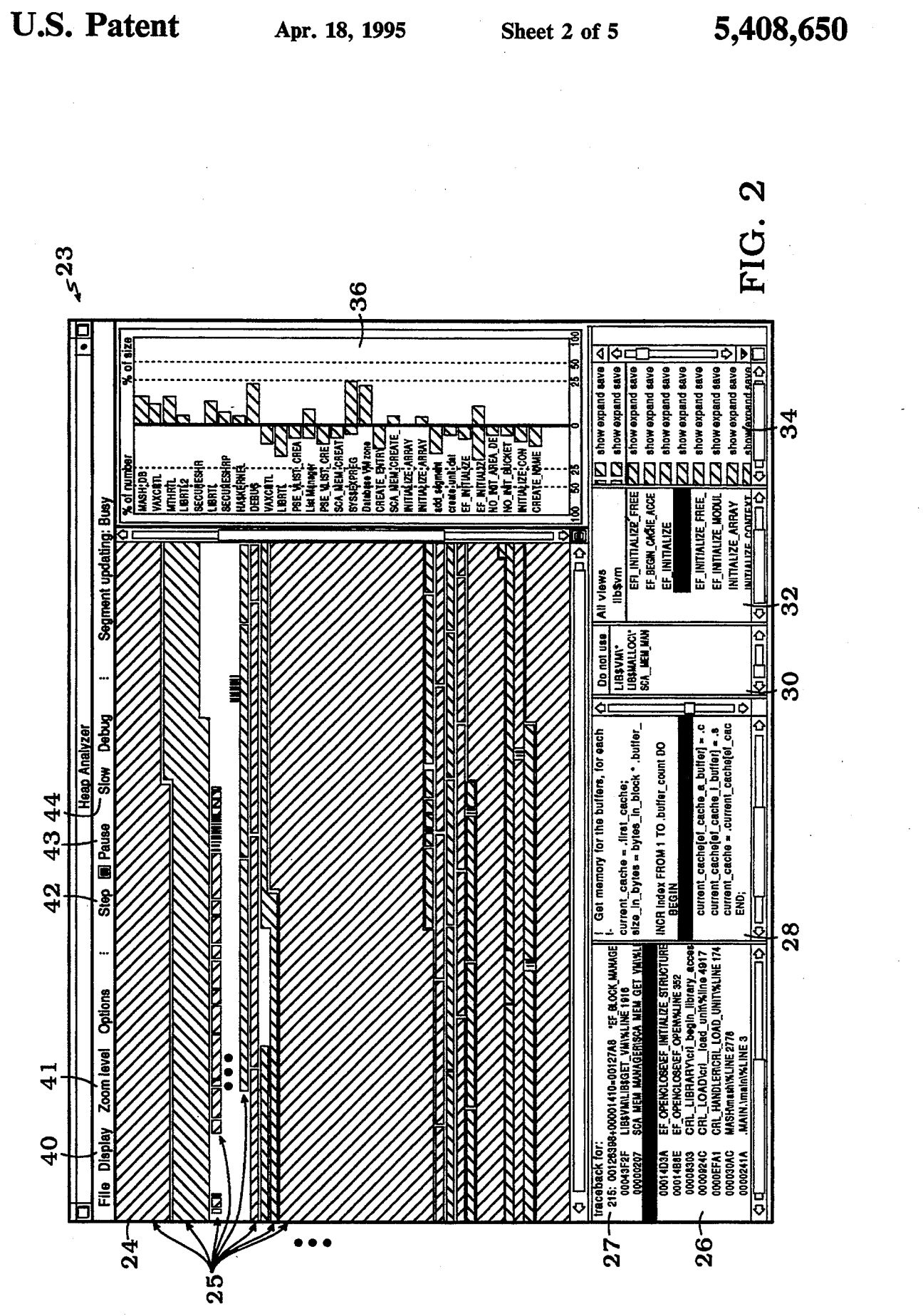

FIG. 2 depicts a graphic representation 23 of dynamically allocated memory segments and related information. The representation is displayed to a user on the screen of the display device 22 (FIG. 1). The representation 23 includes a map 24 of allocated memory segments depicted by segment type 25, a listing 26 of the call-stack associated with a selected memory segment, a listing 28 of the lines of source code associated with the allocation of the selected memory segment, a listing 30 of the memory allocation commands for which allocation information is omitted from the map, a listing 32 of selectable views for each of the memory segment types, a color or pattern selection list 34 and a histogram 36 of allocated memory types. Preferably, the display device is a color monitor, which depicts the segments in various colors. The map, listings and histogram are discussed separately below. The various portions of the display devoted to the map and the various listings can be widened, narrowed, lengthened or shortened by a user, with conventional "windows-type" commands.

The map 24 includes various colors or patterns depicting allocated memory segments. Each segment is represented by a color or pattern which differs from the colors or patterns of neighboring segments. The map depicts memory locations with the lowest address at the top, left-hand corner of the screen and the memory location with the highest address at the bottom right-hand corner. The map scrolls, as necessary, to depict the locations which are newly allocated. The various segments may include their segment type designations, depending on instructions from the user, as discussed below. Memory locations which are not allocated are depicted in a background color or pattern.

The listing 26 of the call-stack includes information which allows a user to trace the memory allocation commands associated with a selected memory segment through various program routines. A user can thus determine which of the routines are appropriately or inappropriately allocating and releasing memory locations. Similarly, the user can determine if a routine is calling for appropriately sized blocks of memory. This information allows a user to optimize the program in terms of memory usage and run-time efficiency, as they relate to memory allocation.

The call-stack provides to the user, in its first line 27: a creation count "215" which indicates that this is the 215th block allocated to the program; the address "00126398" of the location at the beginning of the segment; the number of locations "00001410" in the segment; the address "001277A8" of the location at the end of the segment; and the name of the segment type "EF_BLOCK_MANAGER," which is the name of an associated program sub-routine, as discussed below. The second and following lines of the call-stack trace the associated memory allocation command back through the related lowest order program routines to the related higher-order routines. For example, the second line of the call-stack contains: the address of the memory location "00043F2F" which contains the code for the applicable portion of the lowest-order routine; the name "LIB$VM" of the related module; the name "LIB$GET_VM" of the command which invokes the memory allocation service routine; and the source code line number of the command. The next line of the call-stack lists the same information for the command which calls LIB$GET_VM and so forth.

The listing 28 provides to the user lines of source code from a selected routine included in the call-stack. The lines displayed in the listing 28 in FIG. 2 are part of the selected, or highlighted, EF_BLOCK_MANAGER sub-routine. The user may scroll through the lines of code to determine, for example, if the sub-routine includes a call to a related memory deallocation routine. This enables a user to determine if the program sub-routine requires modification, and how to modify it to achieve a desired result.

The listing 30 includes the names of the sub-routines for which segment type information is not shown. The exemplary list includes the LIB$VM* "family" of routines which are VMS memory allocation low level service routines that are invoked by a call to one of the various memory allocation routines. The system uses the associated call-stack and the information in the Do-not-use list 30 to assign to each memory segment a segment type. The segment type assigned to a particular segment corresponds to the name of the lowest level routine on the associated call-stack that is not on the list 30. Accordingly, the memory segment associated with the call-stack depicted in FIG. 2 is assigned the segment type EF_BLOCK_MANAGER, since the two lower level routines on the call-stack, namely, LIB$-GET_VM, which is one of the LIB$VM routines, and SCA_MEM_MANAGER, are on the Do-not-use list 30.

A user names low level routines on the Do not use list 30 so that he or she can view the effects of these routines on higher level program routines. For example, a user may want to view the allocation of memory locations to a number of high level sub-routines and their later deallocation. Since these sub-routines and every other sub-routine invoke memory allocation routines which are in the LIB$VM family, the memory locations would all be listed as LIB$VM segment types. This probably is not helpful to understanding the operations of the various higher level routines. Accordingly, the user directs that the locations allocated to the higher level sub-routines be listed as segment types corresponding to these higher level sub-routines, by including the lower level routines on the Do not use list 30.

If a user wants to see how the various LIB$VM/* service routines allocate segments, the user removes them from the Do-not-use list 30 before running the program and the program then depicts the locations allocated by these service routines as segment types corresponding to a routine in the LIB$VM family.

The listing 32 of selectable views allows a user to designate one or more segment types and temporarily "hide" them from view. The user can thus selectively customize the graphic display, such that various underlying segments or segments of particular interest can be seen, without permanently eliminating segments from the map. The user "deselects" a type to include the associated segments in the map.

The user can also completely eliminate segment types from the map, instead of merely hiding them, by selecting an appropriate option from the listing 32. The system 12 then releases the memory locations allocated to storing related information, such as the associated call-stacks. The release of these locations may speed up the operation of the system, and in turn, the execution of the application program.

A user can further customize the map 24 by selecting colors for the segments from the color or pattern selection list 34. If a user is interested in the operation of a particular subroutine, the user may assign one color to the segment type associated with that subroutine and another color to all other segment types. Alternatively, the user can select contrasting colors for the various segments. If the system selects the colors, the system selects colors of high contrast for neighboring segments and for segments which overlay other segments.

The histogram 36 provides information relating to the amounts of allocated memory, classified by segment type. The center line represents 0% and the right and left boundaries each represent 100%. The right side of the histogram denotes the percentage of total allocated memory locations assigned to each of the segment types. The left side represents, as a percentage of the total number of segments, the number of segments associated with the various segment types. Referring to the top line of the histogram, a large percentage of the allocated memory locations are designated as segment type "MASH_DB," as indicated by the bar on the right side of the histogram. The number of segments associated with these locations is very small, as denoted by the imperceptively small bar on the left side of the histogram. The histogram thus indicates that these locations were allocated as a single block or a very small number of blocks.

As discussed above, the user interacts with the display device to request that additional information be displayed, or that the information be displayed in varying degrees of detail. For example, the user may request that the names of the segment types be included in the map 24, using options in a Display pull-down menu 40. The user may similarly request an enlargement of a selected region of the display, using the Zoom level pull down menu 41.

The user can also control the relationship between the display and the application program using a Pause button 42, a Step button 43 or a Slow button 44. The user may suspend the execution of the application program or step the program by memory events, by appropriately activating the Pause or Step buttons 42–43. Alternatively, by activating the Slow button 44, the user may specify that the operations of the main processor in sending update information to the display unit be slowed, so that the updates can be more easily followed.

III. System Operation

Figure 3:
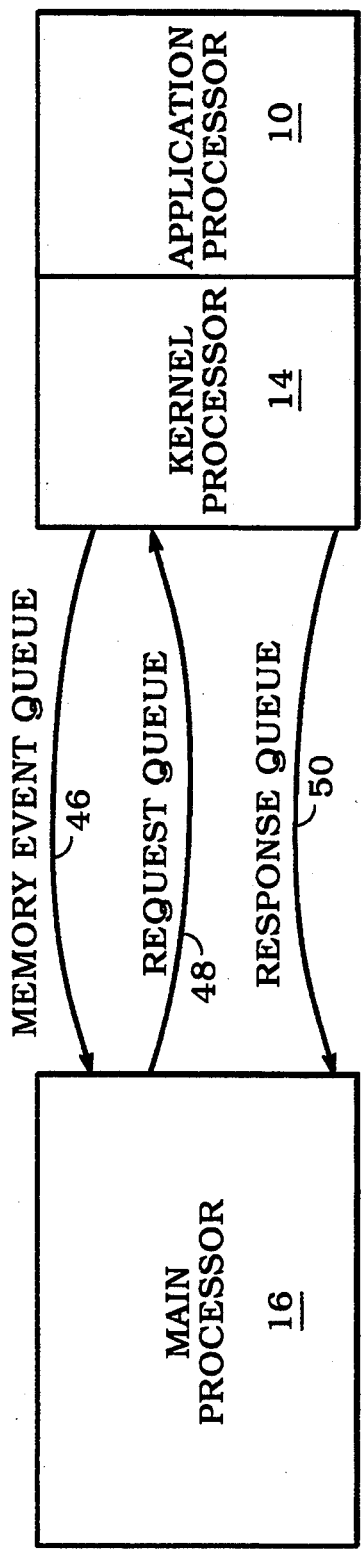
FIG. 3 is an illustration of the communication links between a main processor and a kernel processor depicted in FIG. 1.

Referring to FIG. 3, the various processors and the communication links between them are depicted in block diagram form. As discussed above, what we have labeled processors may also be processes, modules, images or any combination thereof. In the preferred embodiment the kernel processor 14 is an image which operates within the application program. The kernel processor includes initialization features which ensure that it is run first when the application program is executed. The kernel processor establishes the main processor 16 and the communication links 46–50 between them and sets up its own internal data structures for memory segment data. The communications between the kernel and the main processors are discussed in more detail below.

When the application program is run, the kernel processor 14 replaces calls to memory allocation and deallocation routines in the program with calls to substitute memory event routines. Thereafter, calls from program routines to the memory allocation and deallocation routines invoke these memory event routines, which notify the kernel processor each time they are called. After receiving a notification, the kernel processor determines which memory locations are involved. Such information is available from the system service routines, which are the low-level operating system routines that are called by the program sub-routine. Alternatively, the kernel may acquire such information from a system image list, which includes information relating to memory locations assigned to the associated program image file.

The kernel processor 14 next sends a memory event message to the main processor 16, using a memory event queue 46. This memory event queue is a circular queue which is stored in a "global," or shared, section of memory that is accessible to both the main processor and the kernel processor. The main processor later retrieves the message from the memory event queue 46, processes it and updates the memory event information which it then sends to the display unit 20 (FIG. 1) over communication link 52. The communications between the main processor and the display unit are discussed in more detail with reference to FIG. 5 below.

The main processor 16 removes messages from the memory event queue 46 when it has time to process them. The main processor 16 often runs slower than the application program, since the main processor communicates with the display unit controller 21, which, in turn, formulates related drawing instructions for the display device 22 (FIG. 1). The operations of the main processor may thus fall behind those of the application program, which results in a backlog of messages on the memory event queue 46. When the queue is full, the kernal processor 14 sets a flag in the shared memory that indicates that it is suspending the execution of the application program.

The main processor 16 continues its operations and processes the memory event messages on the memory event queue 46 whenever it can. As soon as the main processor 16 empties a predetermined number of slots in the memory event queue 46, the main processor notifies the kernel processor, and in response the kernel processor allows the application program to proceed. At the same time, the main processor continues to process requests from the display unit and any messages on the memory event queue 46. The operations of the application program and the main processor are thus kept in relative synchronism, without idling either of them unnecessarily.

In response to a user's activation of the Step button 42 (FIG. 2), the main processor and the kernel processor operate together to step the application program memory event-by-memory event. When a memory event is added to the memory event queue, the main processor sets an appropriate flag in the shared memory and in response the kernel processor 14 suspends the operation of the application program. Thereafter, when the main processor processes the memory event it notifies the kernal processor, which allows the application program to proceed. If the user requests that the main processor and the application program operate in synchronism, by activating a Synch button (not shown), the kernel and the main processor maintain a memory event queue with a maximum length of one. The main processor thus sets an appropriate flag in the shared memory and the kernal processor suspends execution of the application program if the main processor cannot process a memory event message and empty the memory event queue before the next memory event occurs.

A user may request that the operations of the main processor in updating the display be slowed by activating the Slow button 44, as discussed above. When this button is activated, the main processor waits at least a predetermined amount of time between the processing of entries on memory event queue.

Figure 4:
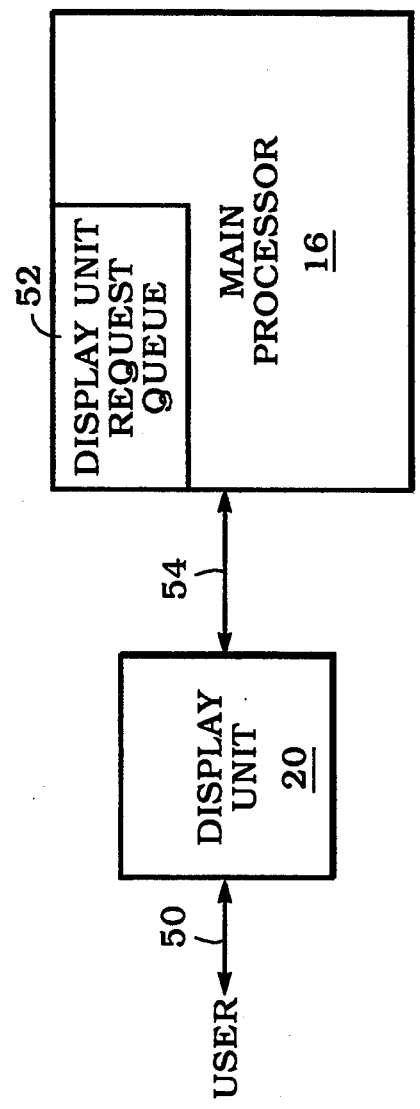
FIG. 4 is an illustration of the communication links between the main processor and a server depicted in FIG. 1.

FIG. 4 depicts the communication links between the display unit 20 and the main processor 16. The main processor 16 maintains a display unit request queue 52, and the display unit 20 communicates with the main processor by adding messages to the queue. The main processor thereafter processes the messages in order of receipt and returns memory-related display information to the display unit over communications link 54.

The main processor spends a majority of its time processing memory events, and thus, sending memory event information over the link 54 to the display unit. To prevent the controller 21 in the display unit from becoming so overloaded with this information that it cannot respond appropriately to a user-initiated request, the main processor limits the amount of information it sends to the controller 21 at any one time.

The main processor 16 includes in the information it sends over communications link 54 a client message, which is a message that directs the recipient to return the message to the sender. The main processor also sets a timer and before the timer expires sends to the controller up to a predetermined maximum number of memory-related messages, i.e., instructions to update the display. The maximum number is selected such that the controller 21 can, at the same time it is processing the messages, also handle any user-initiated requests. This ensures that the user will not experience a long delay between the activation of an embedded button or the selection of a menu option and a corresponding change in the display.

When the controller processes the client message, it sends the message back to the main processor over communications link 52. The controller 21 then has a backlog consisting of at most the messages that the processor sent to it with the client message. If the main processor receives the client message back before the timer expires, the processor re-sets the timer and sends to the controller another client message and up to the maximum number of memory-related messages.

If the controller 21 does not return the client message to the main processor 16 before the timer expires, the main processor stops sending update information to the controller and waits for the receipt of the return client message. After it receives the client message, the main processor again sends update information to the controller.

Figure 5:
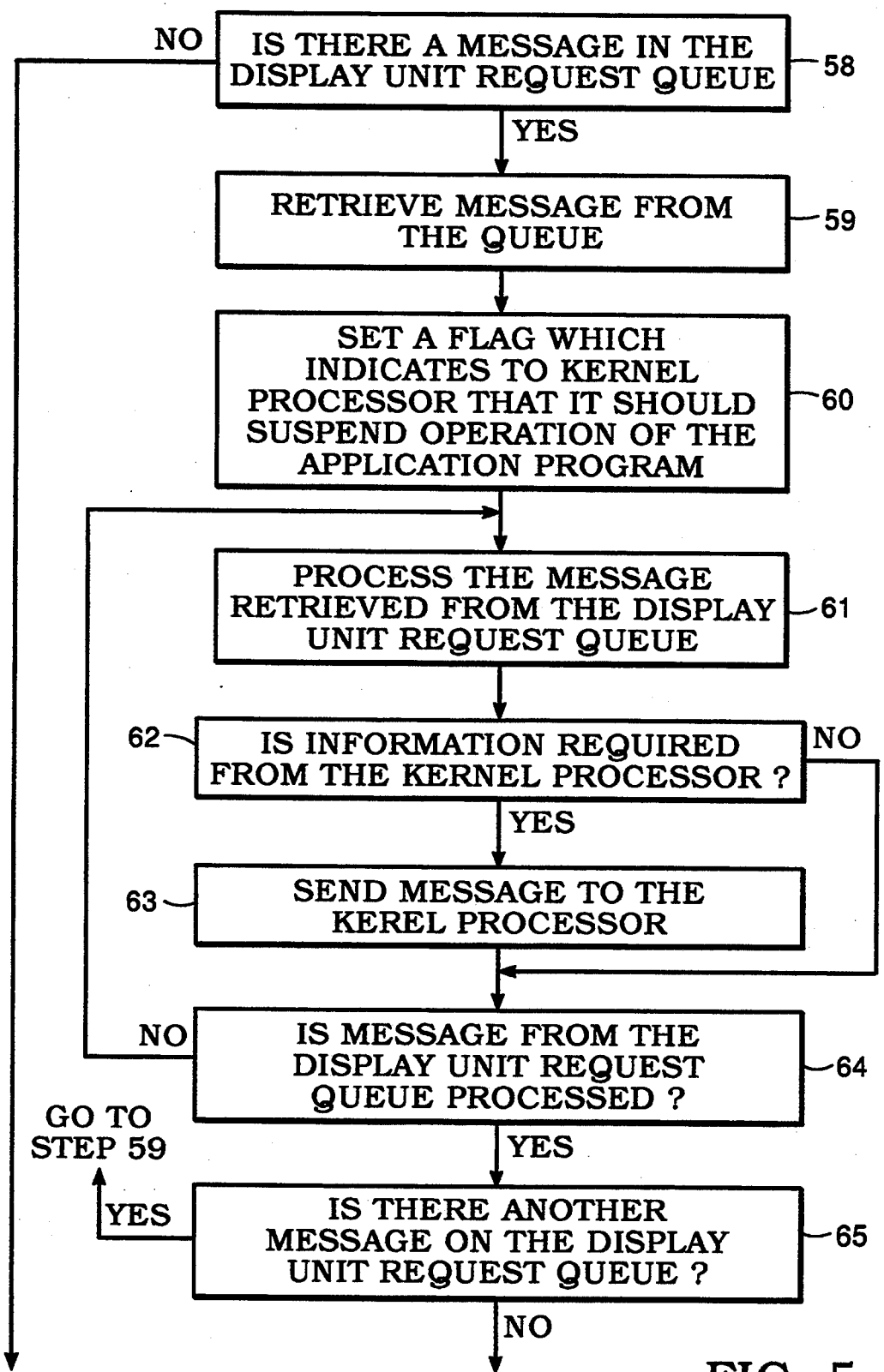
FIG. 5 is a flow chart of the operations of the main processor depicted in FIG. 1.
Figure 5:
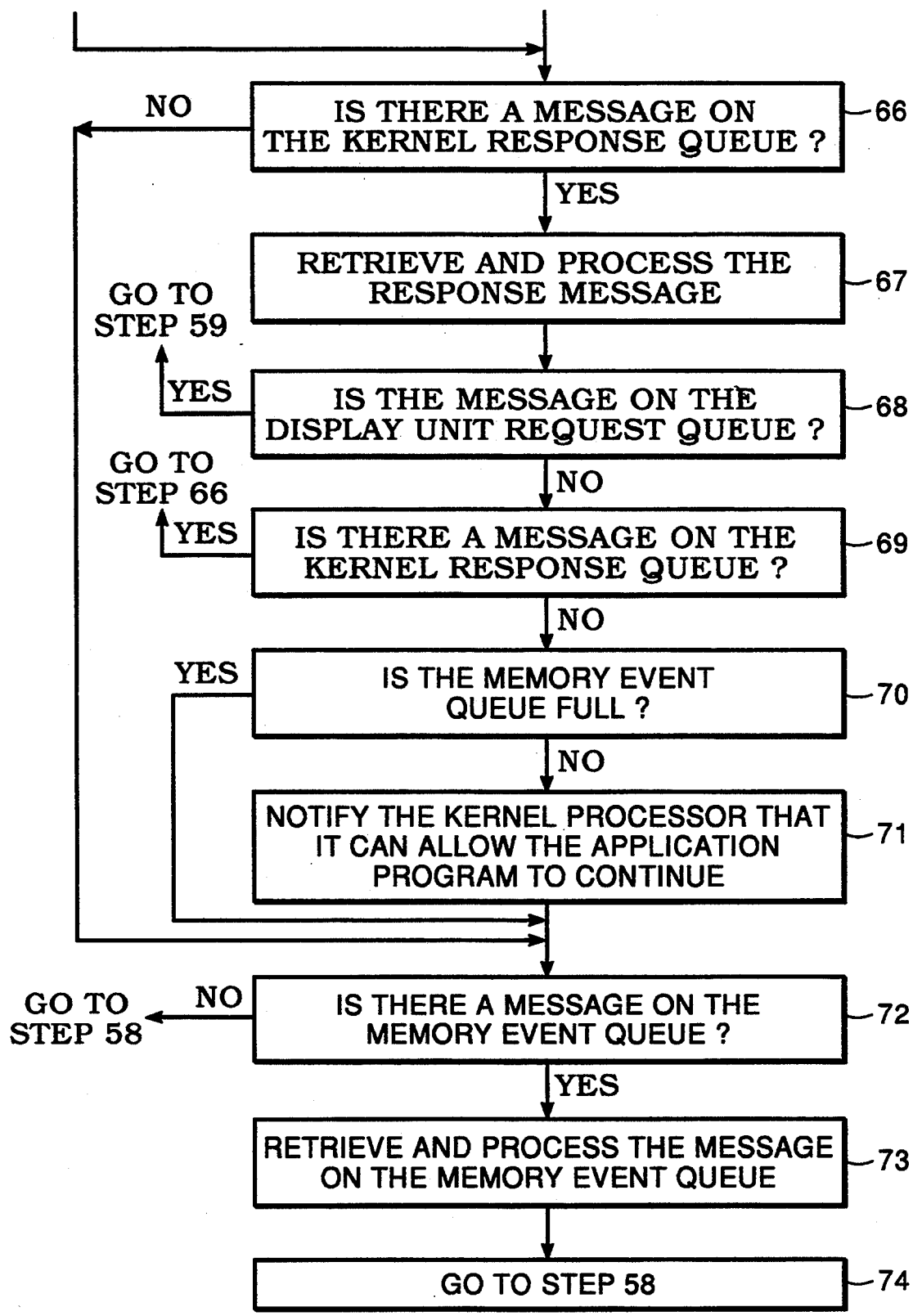

Referring to FIG. 5, the main processor always processes first any requests from the display unit (step 58). By doing this, the processor ensures that a user's request to examine one or more memory events in more detail is processed while the map 24 (FIG. 2) includes a representation of the associated memory segments. Otherwise, a segment of interest may be released by the application program and eliminated from the map, which makes the associated call stack, source code listings and so forth inaccessible from the display.

When the main processor processes a user-initiated request, the processor sends a message to the kernel processor over request queue 42, requesting that the processor suspend the execution of the application program (steps 59–60). To process the request, the main processor may require information from the kernel processor. For example, a user may select a particular memory location and ask for information about the accessibility of that location. Such information is available from the kernel processor, which communicates with the debugger, as necessary. Accordingly, the main processor places a request on the request queue 42

(FIG. 3) asking the kernel processor for the required information (steps 61-62). The main processor then continues to process messages from the display unit (steps 64-65), or as discussed below messages on the memory event queue, while it waits for a response. When the kernel processor has gathered the requested information, it places the information on the response queue 44. When the main processor has processed all remaining messages from the display unit, the processor removes the information from the response queue, processes the information and sends updated instructions to the display unit (steps 66-67).

When both the display unit request queue and the kernel response queue are empty, the main processor processes messages on the memory event queue (steps 68-70). If the memory event queue is not then full, the main processor notifies the kernel processor 14, which allows the application program to continue (step 71). Otherwise, the main processor waits until it has processed a predetermined number of messages from the queue before notifying the kernel processor (steps 73-74).

In summary, the memory analysis system provides a user with memory event information which allows the user to determine if there are memory-related problems or run-time inefficiencies in the application program and to determine which source code routines are involved. With this information, and in particular the segment type classifications, the user can determine how to modify the program to handle the problems and inefficiencies. For example, if the user learns of memory leaks associated with a particular sub-routine, the user can modify that sub-routine or, as appropriate, a related sub-routine to include a call to a memory deallocation routine. Without the segment type information, the user can not readily discern the memory-related problems and inefficiencies discussed above and/or how to solve or eliminate them.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A memory analysis system for displaying memory allocation and deallocation events associated with an application program, the memory analysis system including:
    A. a kernel processor for monitoring memory events and determining (i) if an event is an allocation or deallocation, (ii) the memory locations included in the event and (iii) the application program routines associated with the event;
    B. a main processor for classifying allocated memory locations by segment type, by associating each memory event and the locations corresponding thereto with a routine in the application program;
    C. a display unit for displaying a graphic display of the allocations of memory locations by segment types;
    D. the main processor sending to the display unit information designating allocated memory locations by segment types.

2. The memory analysis system of claim 1 further including:
    a. in the main processor
        i. means for tracing a memory allocation command back through related routines in the application program to produce a call-stack, which is a list of the names of the associated routines;
        ii. means for determining applicable lines of source code from the program routines listed in the call-stack, the main processor sending to the display unit information that associates a segment type with a call-stack and with lines of source code, and
    b. in the display unit, means for displaying the call-stack and the lines of source code associated with a selected allocated memory segment.

3. The memory analysis system of claim 2 further including in the display unit means for depicting the allocated memory locations in a map, with locations designated by segment type.

4. The memory analysis system of claim 3 further including:
    a. designation means for designating routines for which segment type information is to be temporarily omitted from the display, the designation means sending information to the main processor which identifies the routines so designated; and
    b. in the main processor, means for refraining temporarily from sending to the the display unit instructions to depict particular memory locations as the segments types designated as omitted by the designation means, the main processor, as necessary, classifying locations previously classified as segment types corresponding to the routines designated as omitted as types corresponding to other routines included on the associated call-stacks.

5. The memory analysis system of claim 4 further including
    a. means for designating routines for which the segment type information is to be eliminated from the display,
    b. in the main processor means for eliminating information about the routines so designated.

6. The memory analysis system of claim 1 further including:
    a. in the main processor
        i. means for determining the amount of memory allocated by segment type, as a percentage of total memory allocated to the application program;
        ii. means for determining, as a percentage of a total number of memory events associated with the application program, the number of memory events associated with a memory segment type; and
    b. in the display means, means for graphically displaying the percentages.

7. The memory analysis system of claim 1 further including:
    a. in the main processor
        i. processor synchronization means for synchronizing the operations of the main processor to the memory events associated with the application program, wherein the processor synchronization means communicates with the kernal processor, which suspends the execution of the application program, while the main processor continues to process information relating to memory events, the processor synchronization means notifying the kernal processor to allow the application program to proceed when information relating to no more than a predetermined number of memory events requires processing by the main processor; and ii. display synchronization means for synchronizing the operations of the display unit and the operations of the main processor, wherein the display synchronization means prevents the main processor from sending display update information to the display unit if more than a predetermined number of the messages sent previously require processing by the display unit.

8. The memory analysis system of claim 1 further including a. a debugger for maintaining a debugger table associating symbols and locations in a compiled executable version of the application program to symbols and locations in a source code version of the application program;

b. in the kernal processor, i. means for entering the debugger table and formulating a table which relates symbols and locations in an image file version of the application program to symbols and locations in the source code version of the application program; and ii. means for utilizing the symbol and location information in the table so formulated to associate allocated memory locations with source code routines in the application program.

9. A method of producing a display of dynamically allocated memory locations associated with an application program, including the steps of:

A. monitoring memory events;

B. determining for each event the memory locations involved and the program routine associated with allocated memory location;

C. classifying allocated memory locations corresponding to a memory event by segment type, which corresponds to the associated routine in the application program; and C. displaying a graphic depiction of allocated memory locations, depicting the locations by segment types.

10. The method of producing a display of dynamically allocated memory locations of claim 9 further including the steps of:

D. tracing a call to a memory allocation routine through related routines in the application program to produce a call-stack, which is a list of associated routines;

E. associating lines of source code from selected routines named in the call-stack with the allocated memory segments, and F. displaying the call-stack and lines of source code associated with a selected allocated memory segment.

11. The method of producing a display of dynamically allocated memory locations of claim 9 further including the step of graphically depicting allocated memory segments in a map in which each segment is depicted by segment type.

12. The method of producing a display of dynamically allocated memory locations of claim 11 further including the steps of:

a. designating program routines for which segment information is to be omitted from the map; and b. refraining from including in the display information relating to the segments designated as omitted.

13. The method of producing a display of dynamically allocated memory locations of claim 12 further including the step of assigning to each memory location a segment type which corresponds to a program routine on the associated call-stack, which is not designated as omitted.

14. The method of producing a display of dynamically allocated memory locations of claim 9 further including the steps of:

a. determining for each segment type the amount of memory allocated by segment type, as a percentage of total memory allocated to the application program;

b. determining, as a percentage of a total number of memory events associated with the application program, the number of memory events associated with each segment type; and c. including in the display a depiction of the percentages determined in steps a and b.

15. The method of producing a display of dynamically allocated memory locations of claim 9 further including the steps of:

a. synchronizing the operations of the main processor to the memory events associated with the application program, wherein the execution of the application program is suspended while information relating to more than a predetermined number of memory events requires processing by the main processor; and b. synchronizing the operations of the display means and the operations of the main processor, wherein the operations of the main processor are controlled to prevent the main processor from sending display information messages to the display unit if more than a predetermined number of previously-sent display information messages require processing.

* * * * *